UNITED STATES PATENT OFFICE.

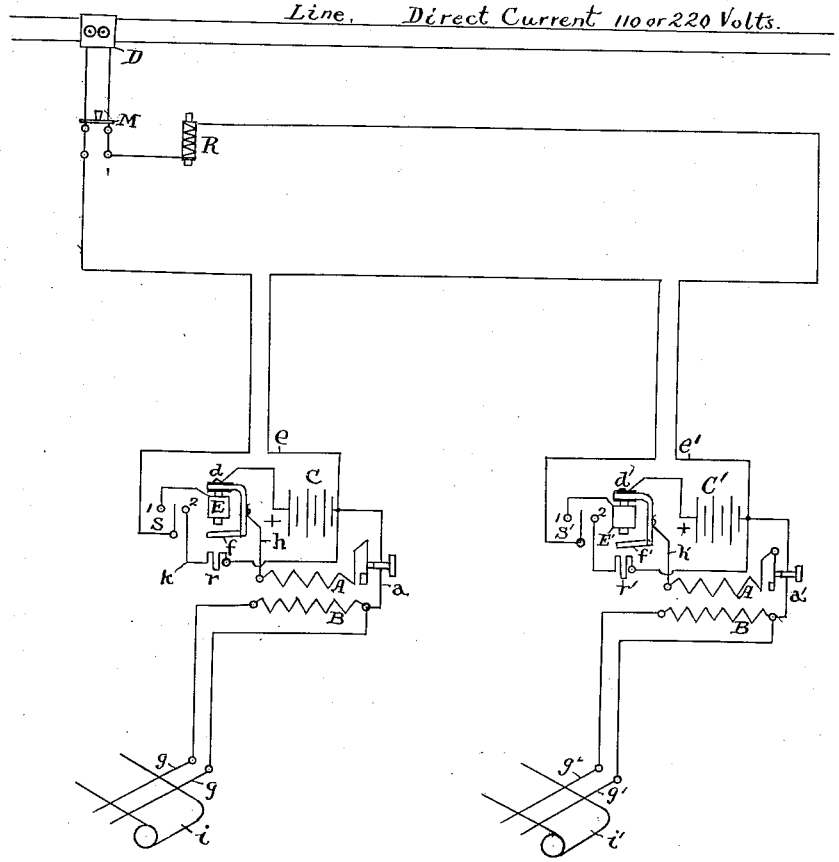
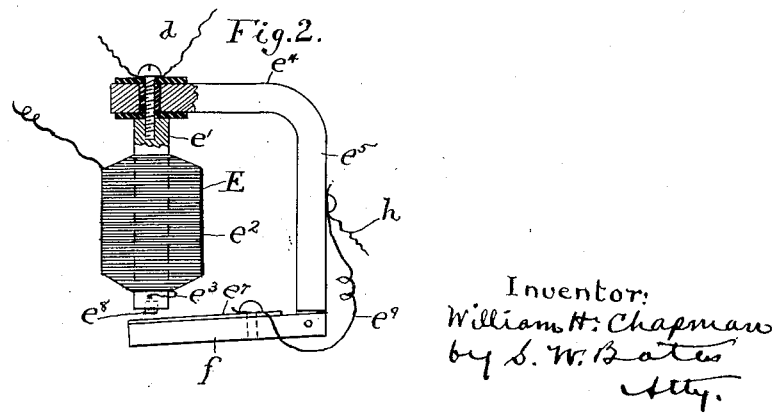

WILLIAM H. CHAPMAN, OF PORTLAND, MAINE, ASSIGNOR TO CHAPMAN ELECTRIC NEUTRALIZER COMPANY, OF PORTLAND, MAINE, A CORPORATION OF MAINE.

APPARATUS FOR NEUTRALIZING STATIC ELECTRICITY.

1,262,173.  Specification of Letters Patent.  Patented Apr. 9, 1918.

Application filed April 21, 1917. Serial No. 163,709.

*To all whom it may concern:*

Be it known that I, WILLIAM H. CHAPMAN, a citizen of the United States, residing at Portland, in the county of Cumberland and State of Maine, have invented certain new and useful Improvements in Apparatus for Neutralizing Static Electricity, of which the following is a specification.

My present invention relates to the removal of static electricity from paper, fabrics and other material in process of manufacture and the general object of the invention is to cheapen and simplify the apparatus, necessary to do this work.

In my original process of neutralizing static electricity, as described in my Patent No. 777,598, dated Dec. 13, 1904, and other subsequent patents, static electricity developed in the material in process of manufacture or manipulation was neutralized by charging a small wire or discharger having fine points or surfaces with a high voltage alternating charge, whereby positive and negative ions were discharged to the material and acted to neutralize the static charge, whether the same was positive or negative. A single wire or discharger was originally used and later, I made use of a pair of dischargers located adjacent to each other, each one of which was alternately charged with positive and negative electricity causing an interchange of both kinds of ions. When an alternating circuit was used, I employed a transformer to increase the voltage of the commercial circuit which was usually 110 volts, up to about 10,000 volts and when a direct circuit was used, I was obliged to make use of a rotary converter and a transformer to produce the desired result. This apparatus was expensive to build and I have been forced to charge a comparatively high price to the trade which limited the use to the larger and more wealthy manufacturers.

In my present invention, I have devised an apparatus, whereby I make use of a comparatively inexpensive induction coil, such as is now used in the ignition of gas engines with a battery which is made up of back electromotive force cells and in practice I also use a simple and cheaply constructed automatic circuit maker, the whole apparatus being much less expensive to manufacture than that which I have found it necessary to use in the past.

In carrying out my invention I make use of an induction coil which is connected with a pair of dischargers arranged adjacent to each other and to the material to be treated. The coil supplies high voltage alternating charges to the two dischargers so that there is a constant interchange of electric ions, between them, forming an ionized field through which the material passes. A battery is employed of back electromotive force cells, such battery when charged with an electric current producing a reverse electromotive force which I utilize to add to the normal current to energize the induction coil. Each terminal of this battery is connected to the supply circuit and to one of the primary terminals of the induction coil. The result is, that when the vibrator of the induction coil is out of contact, the current from the supply circuit (which is by preference any commercial voltage and low amperage) passes through the battery and thereby develops in it a back acting electromotive force. When the vibrator is in contact, the back electromotive force of the battery which has been developed by the current passing through it, is added to the current from the supply circuit. The two currents thus combined are sufficient to start the vibrator of the induction coil which would not be moved by the relatively weak current from the supply circuit alone.

In this way, I am able to reinforce the weak current of the line by the action of the battery cells which are constantly charged and discharged, by this means, to operate the induction coil and that with a low voltage current which has no damaging effect on the contact points of the vibrator, since the voltage is regulated and limited to an amount best adapted to the endurance and efficiency of the coil.

My invention may be more readily understood by reference to the accompanying drawing in which is shown an installation arranged according to my invention and adapted to be used, for instance, on a number of printing presses.

In the drawing,

Figure 1 shows a diagram of the apparatus with two installations and,

Fig. 2 is an elevation of the special circuit maker designed to be applied to this system.

In the drawing similar figures of reference indicate similar parts except that in the installation shown on the right hand, parts corresponding with those of the left hand apparatus are marked with a prime mark.

In the following description, the reference is to the left hand installation which is duplicated at each machine.

In the drawing $i$ represents a roll of paper being acted upon by adjacent and parallel dischargers $g$, $g$. These dischargers are constantly interchanging alternating charges of positive and negative ions, thereby creating an ionized field through which the paper passes and in which the static electricity is neutralized. These two dischargers are connected to the two terminals of the secondary coil B of the induction coil of which A represents the primary coil, C represents a battery made up of one or more cells connected in series which are capable of producing a back electromotive force when charged with a direct current. These may be for instance storage battery cells or dry battery cells in which some moisture is still present.

Each terminal of the battery is connected with the supply circuit and also with one of the terminals of the primary of the induction coil and one of the terminals of the secondary winding of the induction coil is connected by a wire $a$, with the terminal at the vibratory end of the primary coil as is the usual practice.

In making the connection between the positive terminal of the battery and the corresponding terminal of the primary of the induction coil, I make use of a circuit maker indicated generally by E. The circuit maker E is constructed of a core $e'$ having a winding $e^2$ connected through the three point switch S to the supply circuit. The inner end of the winding $e^2$ is connected with the core at $e^3$, so that the current passes through the winding and core. The core is secured to the upper horizontal member $e^4$ of a frame having a vertical member $e^5$ and a lower pivoted horizontal member or armature $f$. The core is insulated from the horizontal member $e^4$ and is connected by wire $d$ to the positive end of the battery. The armature $f$ is provided with a brass plate $e^7$ and the end of the core is provided with a brass contact point $e^8$, to prevent the sticking of the armature. The armature $f$ is pivoted to the frame, so that it has a limited vertical swinging motion and when not attracted by the core, drops to its normal off-position. A connecting wire connects the armature with the vertical member of the frame to carry in current around the joint.

The frame of the circuit closer is connected by wire $h$ to one terminal of the primary of the induction coil. The contact point 2 of the three-way switch S is connected by wire $k$ to the negative terminal of the battery and thence, with the supply circuit. A resistance $r$ is inserted in this line. D represents the direct current supply circuit, M the main switch and R represents a resistance tube which is inserted in the branch circuit to reduce the amperage to an amount which will work well with the induction coil. In practice, I prefer to reduce the amperage passing through the apparatus to $1\frac{6}{10}$ amperes, either by the use of about 12 machines in series or by the resistance of the resistance tube R when a less number of installations are used.

The operation of the system, as applied for instance, in a printing establishment is as follows:

When the main switch M is closed it allows a current of $1\frac{6}{10}$ amperes to flow through the branch circuit as determined by the resistance tube R and the opposing electromotive force of the several batteries C, C' or their equivalents in the resistances $r$, $r'$. If the switch S on any outfit is turned to the point 1, it puts that outfit in action but if turned to point 2, it puts it out of action. The switch S is of the usual commercial type three-way switch and is always closed either to one side or the other, so that it never leaves the circuit open. When closed to point 1, it admits the $1\frac{6}{10}$ ampere current through the circuit maker coil E to the core of said coil, thence through wire $d$, through the battery C and out through wire $e$ to the next outfit in the branch circuit. Respect must be paid to the polarity of the batteries, so as to have the positive side of the line lead to the positive side of the first battery and the negative end of the first battery to the positive of the next outfit in series and so on. As soon as the current has started through coil E, it causes the armature $f$ to lift and come into connection with the core of the coil E. The contact of the armature with the core closes a circuit from the battery through the primary of the induction coil. This puts the vibrator into action and maintains an alternating charge of 8000 or 10000 volts between the two terminals of the discharger. Under these conditions if an ammeter is inserted in the primary circuit of the coil and another in the wire $d$ leading to battery C after the device is started, it will be found to record in the present instance $1\frac{5}{10}$ amperes in the primary circuit and only $\frac{1}{10}$ ampere in the battery circuit and the resistance at R may be constructed to determine any desired proportion between these two, or it may be made to give $1\frac{4}{10}$ amperes to the coil and 0 to the battery and the battery would neither gain nor lose. It is desirable, however, to have the resistance R of such an amount as to admit a slight average charging current of one or two-tenths of an ampere to the battery so as to maintain it always in a charged condition or at least prevent it becoming entirely discharged. In practice, I find it feasible to use old dry cells which have been used to their limit in gas engine ignition service or in bell ringing service, and such batteries have proved just as good as new ones for my purpose, because of the fact that I use them merely as a means of developing a back electromotive force for purposes of regulation. If the battery were not there, the voltage at the contact points at the instant of rupture would rise to 110 when a 110 volt circuit is used for the supply, but the battery limits the voltage to about 4½ volts at the contact points and insures their preservation although the current operating through them is obtained from the 110 volt circuit. If it is desired to put one of the installations out of action, the switch S is turned to point 2. This releases the armature $f$ which drops by gravity and disconnected the battery from the primary coil and prevents the discharge of the battery. The current of $1\frac{6}{10}$ amperes then flows through resistance $r$ directly out to the next outfit without going through battery D. Resistance $r$ is of such amount as to be the equivalent of battery D in holding the current at the constant value of $1\frac{6}{10}$ amperes.

Such a device as I have described enables me to make use of the relatively cheap induction coil and the cheap and simple battery instead of the expensive rotary converter and transformer while at the same time giving me equally good results in neutralizing the static electricity of paper in the process of printing or other material which may be charged.

I claim:—

1. In an apparatus for neutralizing static 
electricity, the combination of a direct current supply circuit, a discharge wire for discharging to the material to be treated an inductive or corona discharge, an induction coil for supplying high voltage alternating electricity to said discharge wire, a battery composed of one or more back electromotive force cells, said battery being connected in series with the supply circuit and in opposed relation thereto and when the parts are in operative position to both terminals of the primary of said induction coil.

2. In an apparatus for neutralizing static electricity, the combination of a direct current supply circuit, a discharge wire for discharging to the material to be treated an inductive or corona discharge, an induction coil for supplying high voltage alternating electricity to said discharge wire, a battery composed of one or more back electromotive force cells, said battery being connected in series with the supply circuit and in opposed relation thereto and to one of the terminals of the primary of said induction coil, one of the connections between the battery and the said primary being through an automatic circuit maker having a core connecting with the battery and a winding on said core connecting with the supply circuit and with the core and a movable armature connected with the said primary and adapted to be attracted by said core to complete the circuit through the primary coil.

3. In an apparatus for neutralizing static electricity, the combination of a direct current supply circuit, a discharge wire for discharging to the material to be treated an inductive or corona discharge, an induction coil for supplying high voltage alternating electricity to said discharge wire, a battery composed of one or more back electromotive force cells, said battery being connected in series, with the supply circuit and in opposed relation thereto and to one of the terminals of the primary of said induction coil, one of the connections between the battery and the said primary being through an automatic circuit maker having a core, connecting with the battery and a winding on said core connecting with the supply circuit and the core and a frame for supporting said core but insulated therefrom, an armature pivoted to said frame and adapted to be attracted by said core to close the circuit, said armature being connected with said induction coil primary.

In testimony whereof I hereby affix my signature.

WILLIAM H. CHAPMAN.